(12) United States Patent
Cina

(10) Patent No.: US 7,574,438 B2
(45) Date of Patent: Aug. 11, 2009

(54) DATABASE ACCESS WITH MULTILEVEL LOCK

(75) Inventor: Miroslav Cina, Ratingen (DE)

(73) Assignee: SAP Aktiengesellschaft, Walldorf (DE)

( * ) Notice: Subject to any disclaimer, the term of this patent is extended or adjusted under 35 U.S.C. 154(b) by 503 days.

(21) Appl. No.: 10/727,183

(22) Filed: Dec. 3, 2003

(65) Prior Publication Data
US 2005/0125406 A1   Jun. 9, 2005

(51) Int. Cl.
G06F 17/30 (2006.01)
(52) U.S. Cl. .............................. 707/8; 707/3; 707/100; 707/9; 718/102
(58) Field of Classification Search .................. 707/8, 707/102, 100
See application file for complete search history.

(56) References Cited

U.S. PATENT DOCUMENTS

| | | | | | |
|---|---|---|---|---|---|
| 4,965,719 | A | * | 10/1990 | Shoens et al. | 711/100 |
| 5,161,227 | A | * | 11/1992 | Dias et al. | 718/104 |
| 5,551,046 | A | * | 8/1996 | Mohan et al. | 707/8 |
| 5,737,611 | A | * | 4/1998 | Vicik | 710/200 |
| 5,790,851 | A | * | 8/1998 | Frank et al. | 718/104 |
| 6,108,654 | A | * | 8/2000 | Chan et al. | 707/8 |
| 6,412,034 | B1 | * | 6/2002 | Chan | 710/200 |
| 6,658,447 | B2 | * | 12/2003 | Cota-Robles | 718/103 |
| 6,823,511 | B1 | * | 11/2004 | McKenney et al. | 718/102 |
| 7,289,992 | B2 | * | 10/2007 | Walker | 707/8 |
| 2002/0078119 | A1 | * | 6/2002 | Brenner et al. | 709/102 |
| 2002/0083063 | A1 | * | 6/2002 | Egolf | 707/100 |
| 2004/0220933 | A1 | * | 11/2004 | Walker | 707/8 |

* cited by examiner

Primary Examiner—Cam Y T Truong
(74) Attorney, Agent, or Firm—Fish & Richardson P.C.

(57) ABSTRACT

A multi-level lock procedure is used in scheduling access of a table in a database by multiple processes running in parallel. A lock level is associated with a particular process, a higher lock level representing a larger number of other processes having priority over the particular process in accessing the table. Repeatedly attempt to associate the particular process with a lower lock level, and if the particular process has been successfully associated with the lower lock level, release a previous lock level associated with the particular process so that the previous lock level may be associated with other processes. Allow the particular process to access the table when the lock level for the particular process is equal to a preset value.

4 Claims, 3 Drawing Sheets

DATABASE ACCESS WITH MULTILEVEL LOCK

TECHNICAL FIELD

This invention relates to database access with multilevel lock.

BACKGROUND

In a parallel processing environment, a database can be shared by more than one process. For example, a database can contain records, each record containing entries related to customers of a company and entries related to products that the customers have ordered. A first process related to customer relationship management can attempt to access the database to update customer contact information of a particular record. A second process related to inventory control can also try to update a product specification contained in the same record. The customer relationship management information and the inventory control information within the same record can be dependent or independent of each other. To prevent multiple processes from updating the same record resulting in errors, a locking mechanism is provided so that before the first process attempts to modify a record, the first process "locks" the record to prevent other processes from modifying the record. When the second process attempts to modify a locked record, the attempt is rejected, and an error message is returned to the second process. The second process waits a period of time before attempting to modify the record again.

SUMMARY

In general, in one aspect, the invention features a method of scheduling access of a table by multiple processes, including associating a lock level with a particular process, a higher lock level representing a larger number of other processes having priority over the particular process in accessing the table; repeatedly attempting to associate the particular process with a lower lock level, and if the particular process has been successfully associated with the lower lock level, releasing a previous lock level associated with the particular process so that the previous lock level may be associated with other processes; and allowing the particular process to access the table when the lock level for the particular process is equal to a preset value.

This and other aspects of the invention may include one or more of the following features. The preset value is equal to one. Each of the processes attempts to associate itself with a lower lock level independently of other processes.

In general, in another aspect, the invention features a method that includes, upon receiving a request from a first process to access a record in a database, associating a first lock level to the first process and allowing the first process to access the record but preventing other processes from accessing the record until the first process finishes accessing the record; and upon receiving a request from a second process to access the record while the first process is still accessing the record, associating a second lock level to the second process. The method includes, when the first process finishes accessing the record, releasing the first lock level from being associated with the first process, and either (a) releasing the second lock level from being associated with the second process and associating the first lock level with the second process, allowing the second process to access the record but preventing other processes from accessing the record until the second process finishes accessing the record, and when the second process finishes accessing the record, releasing the first lock level from being associated with the second process, or (b) releasing a lock level from being associated with a third process and associating the first lock level with the third process, allowing the third process to access the record but preventing other processes from accessing the record until the third process finishes accessing the record, and when the third process finishes accessing the record, releasing the first lock level from being associated with the third process.

This and other aspects of the invention may include one or more of the following features. Preventing other processes from accessing the record includes allowing the other processes to read the record but not modify the record. The record is locked when the first lock level is associated with a process. Information is written to a queue to specify which lock level is associated with which process. At least two of the first, second, and third processes are run in a parallel processing environment.

In general, in another aspect, the invention features a method that includes locking a record in a database at multiple levels when multiple processes running in parallel attempt to access the record; assigning a lock level to each of the multiple processes, different processes having different lock levels; and selectively permitting one of the multiple processes to access the record at a time.

This and other aspects of the invention may include one or more of the following features. The lock levels of the processes are reassigned when a process accessing the record terminates its access to the record. A process that attempted to access the record earlier than another process is assigned a lower lock level than the other process, and each process other than the process terminating its access to the record is assigned a lower lock level when the process terminates its access to the record. Information is stored in a queue indicating which process is associated with which lock level. Multiple instances of a procedure are called, where the procedure assigns a lock level to a process, and each instance of the procedure being associated with one of the multiple processes and configured to attempt to assign a different lock level to the process until the process is granted access to the record.

In general, in another aspect, the invention features a system that includes a database to store records, and a queue to store information relating to lock levels of processes that attempt to access the records, different processes having different lock levels when accessing the same record, one of the processes having a particular lock level being allowed to access the record.

This and other aspects of the invention may include one or more of the following features. The system includes a memory to store software code for implementing a procedure in which instances of the procedure are used to assign lock levels to the processes. The software code is configured so that the instances of the procedure are run in parallel.

In general, in another aspect, the invention features a computer program product, tangibly stored on a machine-readable medium, for implementing a multi-level lock process, comprising instructions operable to cause one or more programmable processors to lock a record in a database at a first level to allow a first process to modify the record but prevent other processes from modifying the record; and lock the record at a second level to allow a second process to modify the record after the record is unlocked at the first level but to prevent other processes from modifying the record while the record is being modified by the second process.

This and other aspects of the invention may include one or more of the following features. The computer program product includes instructions operable to cause the one or more programmable processors to, after the record is locked at the second level, check whether the record is locked at the first level, and if the record is not locked at the first level, lock the record at the first level a second time and unlocking the record at the second level. The computer program product includes instructions operable to cause the one or more programmable processors to write to a queue to specify that the record has been locked at the first level and/or the second level. The computer program product includes instructions operable to cause the one or more programmable processors to run the first and second processes in parallel.

In general, in another aspect, the invention features a computer program product, tangibly stored on a machine-readable medium, for implementing a multi-level lock process, includes instructions operable to cause one or more programmable processors to, upon receiving a request from a first process to access a record in a database, associate a first lock level to the first process and allow the first process to access the record but prevent other processes from accessing the record until the first process finishes accessing the record; and upon receiving a request from a second process to access the record while the first process is still accessing the record, associate a second lock level to the second process. The computer program product includes instructions operable to cause one or more programmable processors to, when the first process finishes accessing the record, release the first lock level from being associated with the first process, and either (a) release the second lock level from being associated with the second process and associate the first lock level with the second process, allowing the second process to access the record but preventing other processes from accessing the record until the second process finishes accessing the record, and when the second process finishes accessing the record, releasing the first lock level from being associated with the second process, or (b) release a lock level from being associated with a third process and associate the first lock level with the third process, allowing the third process to access the record but preventing other processes from accessing the record until the third process finishes accessing the record, and when the third process finishes accessing the record, releasing the first lock level from being associated with the third process.

This and other aspects of the invention may include one or more of the following features. The instructions cause the one or more programmable processors to allow the other processes to read the record but not modify the record. The computer program product includes instructions operable to cause the one or more programmable processors to lock the record when the first lock level is associated with a process. The computer program product includes instructions operable to cause the one or more programmable processors to write to a queue to specify which lock level is associated with which process. The instructions cause the one or more programmable processors to execute at least two of the first, second, and third processes in a parallel processing environment.

In general, in another aspect, the invention features a computer program product, tangibly stored on a machine-readable medium, for scheduling access of a table by multiple processes, including instructions operable to cause one or more programmable processors to associate a lock level with a particular process, a higher lock level representing a larger number of other processes having priority over the particular process in accessing the table; repeatedly attempt to associate the particular process with a lower lock level, and if the particular process has been successfully associated with the lower lock level, release a previous lock level associated with the particular process so that the previous lock level may be associated with other processes; and allow the particular process to access the table when the lock level for the particular process is equal to a preset value.

This and other aspects of the invention may include one or more of the following features. The instructions are configured so that the preset value is equal to one. The instructions are configured so that each of the processes attempts to associate itself with a lower lock level independently of other processes.

In general, in another aspect, the invention features a computer program product, tangibly stored on a machine-readable medium, for implementing a multi-level lock process, comprising instructions operable to cause one or more programmable processors to lock a record in a database at multiple levels when multiple processes running in parallel attempt to access the record; assign a lock level to each process, different processes having different lock levels; and selectively allow one of the multiple processes to access the record at a time.

This and other aspects of the invention may include one or more of the following features. The computer program product includes instructions operable to cause the one or more programmable processors to reassign the lock levels of the processes when a process accessing the record terminates its access to the record. The instructions are configured so that a process that attempted to access the record earlier than another process is assigned a lower lock level than the other process, and each process other than the process terminating its access to the record is assigned a lower lock level when the process terminates its access to the record. The computer program product includes instructions operable to cause the one or more programmable processors to store in a queue information indicating which process is associated with which lock level. The computer program product includes instructions operable to cause the one or more programmable processors to call multiple instances of a procedure that assigns a lock level to a process, each instance of the procedure associated with one of the multiple processes and is configured to attempt to assign a different lock level to the process until the process is granted access to the record.

An advantage of the invention is that multiple users can send requests for accessing a shared database record even when another user is currently using the shared database record. The requests are automatically pipelined in a queue so that the users can access the shared database in sequence without being rejected or causing sharing violation errors.

Other features and advantages of the invention are apparent from the following description, and from the claims.

DESCRIPTION OF DRAWINGS

Like reference symbols in the various drawings indicate like elements.

DETAILED DESCRIPTION

Figure 1:
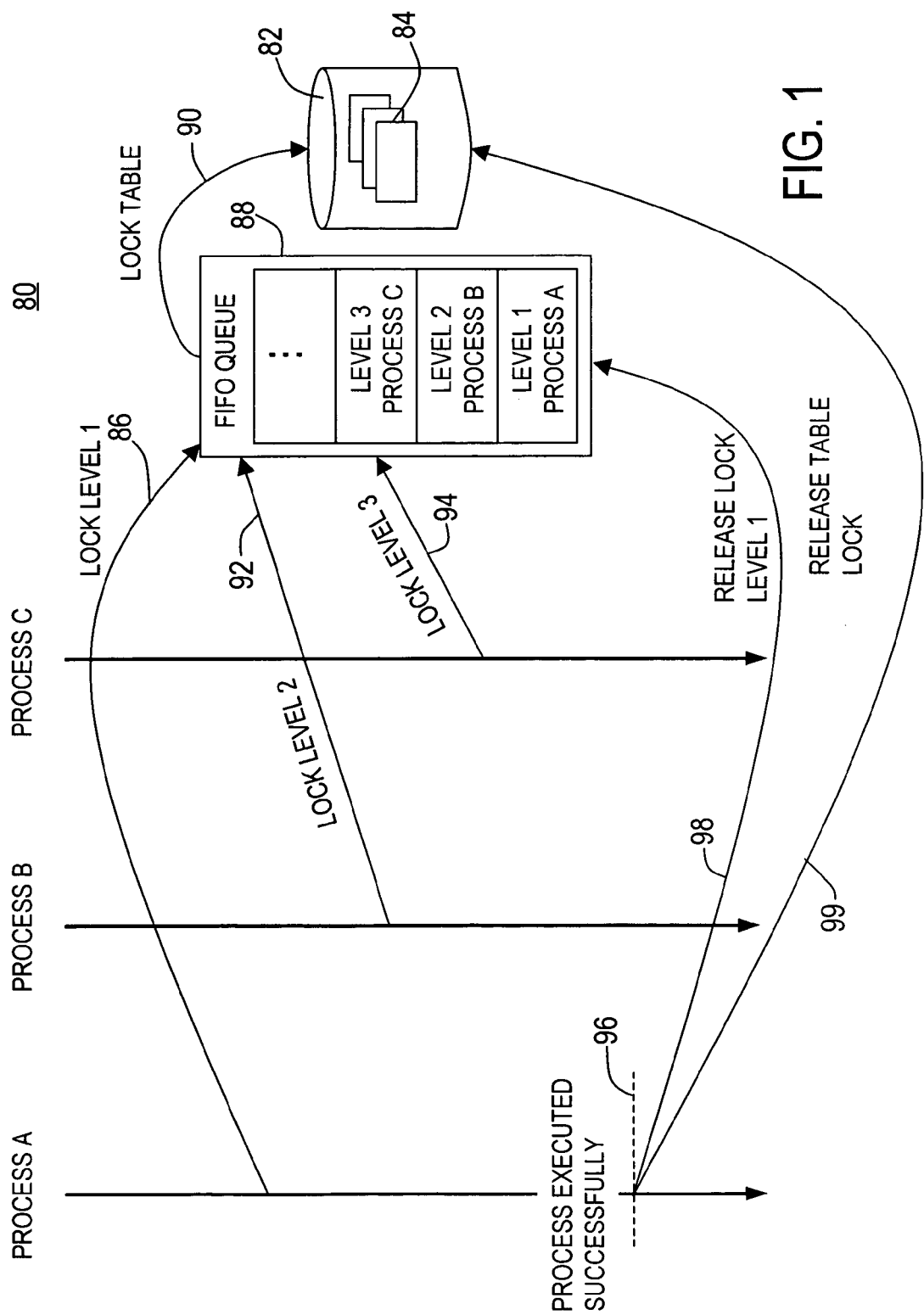
FIG. 1 is a diagram of a parallel processing environment that implements a multi-level lock process.

As shown in FIG. 1, in a parallel processing system 80, multiple software processes (e.g., processes A, B, and C) access and process a table 84 in a database 82. System 80 implements a multilevel lock procedure 100 (FIG. 2) to allow the processes to share table 84 without causing errors when the processes A, B, C attempt to access the same table 84 at the same time. Each process A, B, C attempting to access a table is assigned a "lock level." A process (A, B, or C) is assigned a lock level equal to n if previous (n−1) lock levels have previously been assigned to other processes currently using the same table 84 or waiting to use the table 84. Each process A, B, C attempts to obtain a lower lock level, and if successful, unlocks (releases) the previous lock level so the previous lock level can be available to other processes. A process (A, B, or C) is granted access to the table 84 when its associated lock level is equal to 1. The multilevel lock procedure 100 (described below) provides an efficient scheduling mechanism to allow multiple processes running in parallel to access and process data in table 84.

For example, initially, when process A attempts to access (86) table 84, process A is assigned a "lock level" that is equal to 1 since no other processes are accessing table 84. The assignment of lock level 1 to process A is stored in a first-in-first-out (FIFO) queue 88. Table 84 is locked (90), and process A is granted access to table 84. While process A is processing data in table 84, process B attempts (92) to access the same table 84. Process B is assigned a lock level that is equal to 2 since lock level 1 is already assigned to process A. The assignment of lock level 2 to process B is stored in FIFO queue 88. Before process A finishes using table 84, process C attempts (94) to access the same table 84. Process C is assigned a lock level that is equal to 3 since lock levels 1 and 2 have already been assigned to other processes. The assignment of lock level 3 to process C is stored in FIFO queue 88. When process A successfully executes and finishes using table 84, lock level 1 is released (98), and the table 84 is unlocked (99). This allows process B to access table 84.

The multilevel lock procedure 100 can be implemented as, e.g., a software process or an application programming interface (API), that is called by other processes when accessing a table in database 82. In the description below, depending on context, the term "procedure" is used to refer to the procedure itself or the software (e.g., process or API) that implements the procedure. Depending on context, the term "process" can be a noun (as in "a process that accesses the data in the database") or a verb (as in "to process the data in the database").

Figure 2:
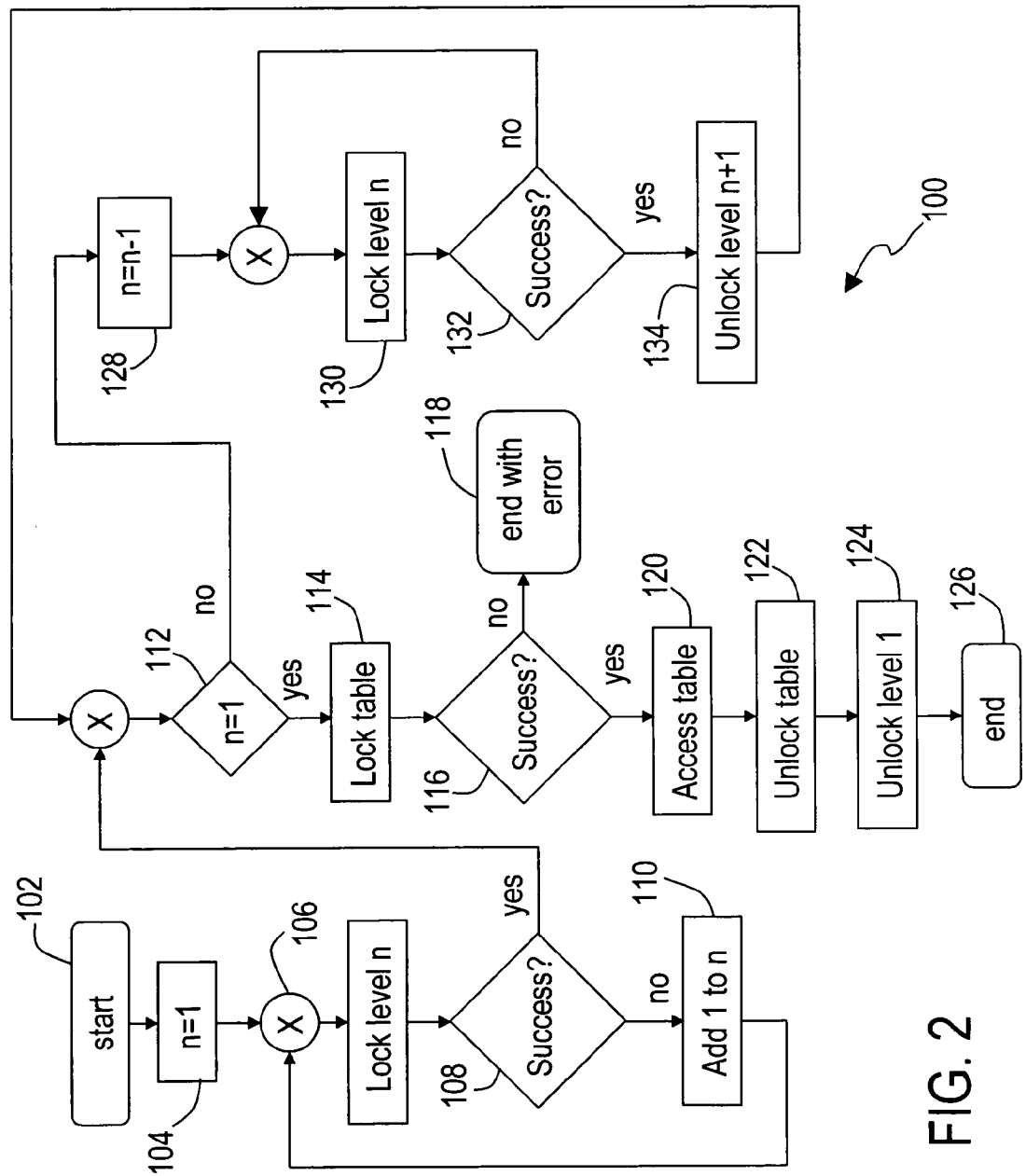
FIG. 2 is a flowchart of a multi-level lock process.

As shown in FIG. 2, procedure 100 starts (102) by assigning (104) a variable n to be equal to 1. The variable n represents a lock level that is assigned to a process (e.g., process A). An attempt is made to assign (106) a lock level n to the process, and a determination (108) is made whether lock level n is successfully assigned. Information relating to which lock levels have been assigned to which processes are stored in FIFO queue 88. If lock level n cannot be successfully assigned to the process, n is incremented (110) by 1, and the determination (106 and 108) of whether lock level n can be assigned to the process is repeated. If lock level n can be successfully assigned to the process, a determination (112) is made whether n is equal to 1. If n is not equal to 1, then n is decremented (128) by 1.

Procedure 100 attempts (130) to assign lock level n to the process, and determines (132) whether the lock level can be successfully assigned to the process. If lock level n can not be successfully assigned to the process, the attempt (130) to assign lock level n to the process is repeated. Procedure 100 can pause for a predetermined period between attempts to assign lock level n to the process. When the lock level n is successfully assigned to the process, the lock level (n+1) is unlocked (134); i.e., the assignment of lock level (n+1) is released from the queue so that lock level (n+1) is available to other processes.

The determination (112) is made whether n is equal to 1. If n is equal to 1, an attempt to lock (114) the table 84 is performed. Locking the table 84 can be achieved by calling a locking API provided by system 80. Locking the table 84 allows one process to access the table and prevents other processes from accessing the table, or allows other users to read but not modify the table. A determination (116) is made as to whether the table 84 is successfully locked. If the table 84 is not locked, procedure 100 ends and returns an error message (118). If the table 84 is locked, access to table 84 is granted to the process, and the process can process (120) and modify the data in table 84. After the process finishes processing and updating table 84, the process calls an unlock API provided by system 80 to unlock (122) table 84. Procedure 100 unlocks (124) lock level 1 (i.e., releases lock level 1 from the FIFO queue 88 so that lock level 1 can be assigned to others), and ends (126).

Each time a process attempts to access a table 84 in database 82, the process calls procedure 100. When multiple processes attempt to access tables in database 82, multiple instances of the procedure 100 are executed in parallel to schedule access of the tables. The following describes how processes A, B, and C access the table 84 by calling procedures 100*a*, 100*b*, and 100*c* (which are instances of procedure 100), respectively, to schedule access of the table.

Figure 3:
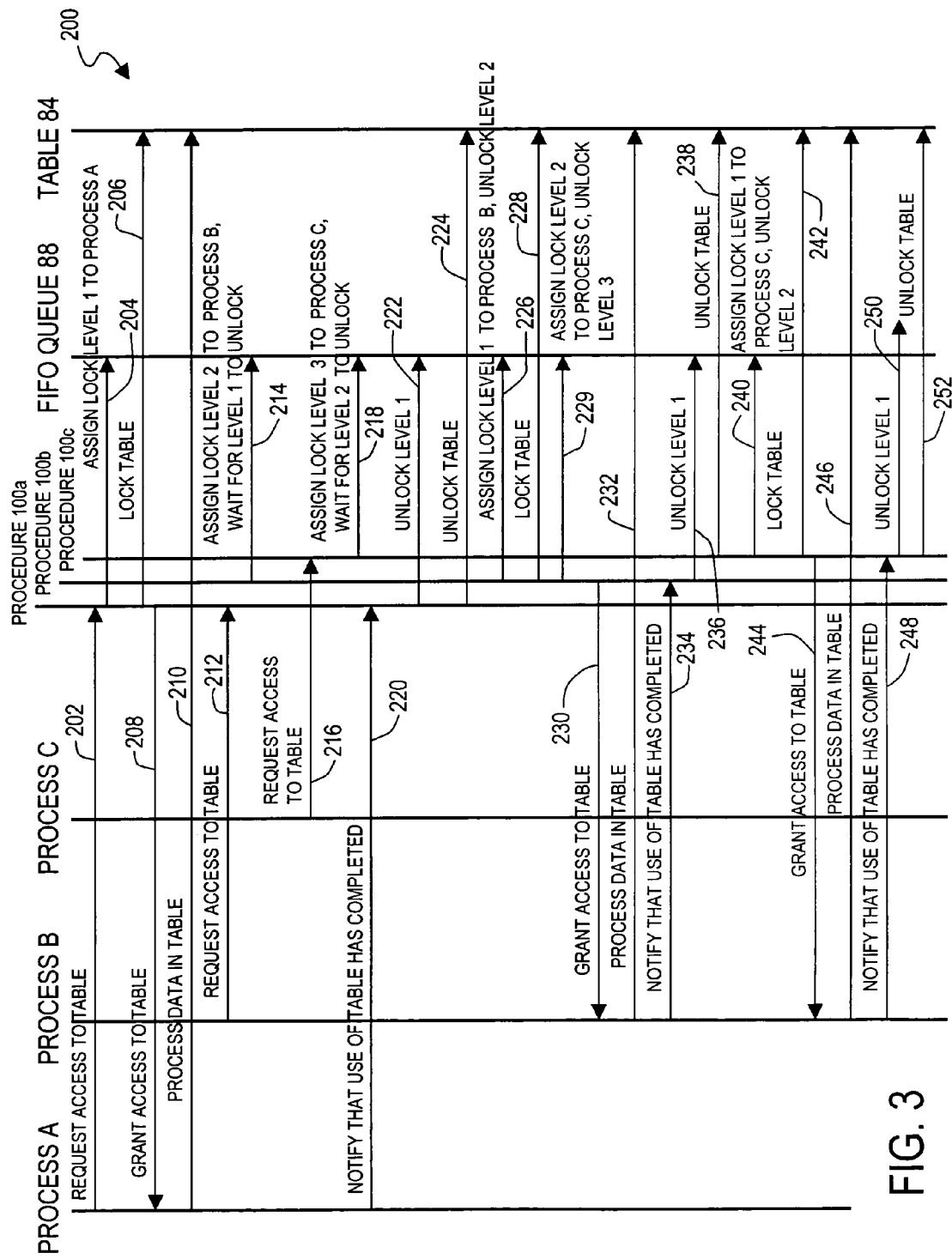
FIG. 3 is timing diagram of a multi-level lock process.

As shown in FIG. 3, a timing diagram 200 shows events that happen when processes A, B, and C attempt to access table 84. Process A requests (202) access to table 84 by calling procedure 100*a*. Procedure 100*a* determines that the table 84 is not locked, assigns (204) a lock level 1 to the process A, locks (206) table 84, and grants (208) access of the table 84 to process A. While process A is processing (210) data in table 84, process B requests (212) access to table 84 by calling procedure 100*b*. Procedure 100*b* determines that lock level 1 has already been assigned to some other process, assigns (214) lock level 2 to the process B, and waits for process A to finish using table 84. While process A is using table 84 and process B is waiting for process A to finish, process C requests (216) access of table 84 by calling procedure 100*c*. Procedure 100*c* determines that the lock level 2 has already been assigned to some other process, assigns (218) lock level 3 to the process C, and waits for processes A and B to finish using the table 84.

Procedure 100*b* repeatedly tests whether it can assign lock level 1 to process B (130 and 132 in FIG. 2). Procedure 100*c* repeatedly tests whether it can assign lock level 2 to process C. When process A notifies (220) procedure 100*a* that process A has finished using table 84, procedure 100*a* unlocks level 1 (222) (i.e., makes lock level 1 available to other processes), and unlocks (224) table 84. Procedure 100*b* determines that lock level 1 is available, assigns (226) lock level 1 to process B, unlocks level 2, locks (228) table 84, and grants (230) access of table 84 to process B. Process B processes (232) data in table 84. When procedure 100*c* detects that level 2 is available, procedure 100*c* assigns (229) lock level 2 to process C and unlocks level 3.

Procedure 100*c* repeatedly tests whether it can assign lock level 1 to process C. When process B notifies (234) that process B has finished using table 84, procedure 100*b* unlocks (236) level 1 and unlocks (238) table 84. Procedure 100*c* determines that lock level 1 is available, assigns (240) lock level 1 to the process C, unlocks lock level 2, locks (242) table 84, and grants (244) access of table 84 to process C. Process C processes (246) data in table 84. When the process C notifies (248) procedure 100*c* that process C has finished using table 84, procedure 100*c* unlocks (250) level 1 and unlocks (252) table 84.

Other embodiments are within the scope of the following claims For example, each lock level may be associated with locking one record in one table, or locking multiple records in one table, or locking multiple records in multiple tables, or locking an entire table, or locking multiple tables.

What is claimed is:

1. A method of scheduling access to a database by multiple processes, comprising:

in multiple instances of a software-implemented procedure, each instance of the software-implemented procedure associated with a particular process of the multiple processes, associating a lock level with the particular process and attempting to associate a different lock level with the particular process until the particular process is granted access to the database, a higher lock level representing a larger number of other processes having priority over the particular process in accessing the database, each process of the multiple processes being associated with no more than one lock level;

repeatedly calling, using the particular process, said each instance of the software-implemented procedure to attempt to associate the particular process with successively lower lock levels until the lock level is equal to a preset value, and each time the particular process has been successfully associated with a lower lock level, releasing a previous lock level associated with the particular process so that the previous lock level is available to be associated with the other processes, the preset value equals to one;

allowing, using the software-implemented procedure, the particular process to access the database when the lock level for the particular process is equal to the preset value, at a computer, storing, in a queue, data indicating which process is associated with which lock level, the computer including a processor;

updating, using the software-implemented procedure, the data indicating which process is associated with which lock level;

reassigning lock levels of the multiple processes when a process accessing a record terminates its access to the record, wherein the process that attempted to access the record earlier than other process is assigned a lower lock level than the other process, and said each process other than the process terminating its access to the record is assigned a lower lock level when the process terminates its access to the record, wherein the particular process changes two or more lock levels from an initially assigned lock level to the lock level having the preset value before the particular process is allowed to access the record, said each process of the multiple processes attempts to associate itself with a lower lock level independently of the other processes, and at least two processes of the multiple processes are being run in a parallel processing environment; and allowing the multiple processes to read the record but not modify the record when the lock levels for the multiple processes are different from a preset value.

2. The method of claim 1 further comprising:

locking the record in the database at multiple levels when the multiple processes running in parallel attempt to access the record, said each process of the multiple processes associated with one of the instances of the procedure; and selectively permitting one process of the multiple processes to access the record at a time.

3. A method of scheduling access to a database by multiple processes comprising:

in multiple instances of a software-implemented procedure, upon receiving a request from a first process to access a record in the database, associating a first lock level with the first process and allowing the first process to access the record, preventing other processes from modifying the record until the first process finishes accessing the record, a higher lock level representing a larger number of other processes having priority over the first process in accessing the database, each process of the multiple processes being associated with no more than one lock level;

at a computer, upon receiving a request from a second process to access the record while the first process is still accessing the record, associating a second lock level with the second process, the computer including a processor;

upon receiving a request from a third process to access the record while the first process is still accessing the record, associating a third lock level with the third process;

when the first process finishes accessing the record, releasing the first lock level, the second and third processes each repeatedly calling one instance of the instances of the procedure respectively associated with the second process or the third process to attempt to associate itself with a lower lock level until the lower lock level is equal to a preset value, the preset value equals to one, wherein if the second process associates itself with the first lock level before the third process associates itself with the first lock level, the third process associates itself with the second lock level and repeatedly attempts to associate itself with the first lock level;

when the second process associates itself with the first lock level, permitting the second process to modify the record;

when the third process associates itself with the first lock level, permitting the third process to modify the record;

updating, using the instances of the software-implemented procedure, data indicating which process is associated with which lock level;

storing, in a queue, the data indicating which process is associated with which lock level;

reassigning lock levels of the multiple processes when a process accessing the record terminates its access to the record, wherein the process that attempted to access the record earlier than other process is assigned a lower lock level than the other process, and said each process of the multiple processes other than the process terminating its access to the record is assigned a lower lock level when the process terminates its access to the record, wherein said each process of the multiple processes changes two or more lock levels from an initially assigned lock level to a lock level having the preset value before said each process of the multiple processes is allowed to access the record;

allowing the multiple processes to read the record but not modify the record when the lock levels for the multiple processes are different from a preset value; and wherein said each process of the multiple processes attempts to associate itself with a lower lock level independently of other processes, and at least two processes of the multiple processes are being run in a parallel processing environment.

4. A system of scheduling access to a database, the system comprising:

a memory;

a database to store records;

a queue to store information relating to lock levels of processes that attempt to access the records, each different process having a different lock level when attempting to access a same record, a process of the processes having a particular lock level, the process having the particular lock level being allowed to access the same record, a higher lock level representing a larger number of other processes having priority over a particular process in accessing the database, each process of the processes being associated with no more than one lock level; and a processor to:

execute multiple instances of a procedure to assign a respective lock level to each process of different processes, each process of at least some of the different processes having a lock level other than the particular lock level, each instance of the procedure associated with said each process of the processes repeatedly call an instance of the instances of the procedure associated with the particular process to attempt to associate the particular process with another lock level that is closer to the particular lock level until the another lock level is equal to a preset value, the preset value equals to one, the procedure allowing any one process to access the record when that one process has the particular lock level;

store, in a queue, data indicating which process is associated with which lock level;

update, using the procedure, the data indicating which process is associated with which lock level;

reassign lock levels of the processes when a process accessing the record terminates its access to the record, wherein the process that attempted to access the record earlier than other process is assigned a lower lock level than the other process, and said each process of the processes other than the process terminating its access to the record is assigned a lower lock level when the process terminates its access to the record, wherein the particular process changes two or more lock levels from an initially assigned lock level to a lock level having the preset value before the particular process is allowed to access the record, said each process of the processes attempts to associate itself with a lower lock level independently of other processes, and at least two processes of the processes are being run in a parallel processing environment; and allow the processes to read the record but not modify the record when the lock levels for the processes are different from a preset value.

* * * * *

UNITED STATES PATENT AND TRADEMARK OFFICE
CERTIFICATE OF CORRECTION

PATENT NO. : 7,574,438 B2  Page 1 of 1
APPLICATION NO. : 10/727183
DATED : August 11, 2009
INVENTOR(S) : Miroslav Cina It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 717 days.

Signed and Sealed this

Seventh Day of September, 2010

David J. Kappos
*Director of the United States Patent and Trademark Office*